(12) United States Patent
Khadem Sameni (10) Patent No.: US 7,647,134 B2
(45) Date of Patent: Jan. 12, 2010

(54) METHOD OF OPERATING A TEMPERATURE MANAGEMENT DEVICE

(75) Inventor: Majid Khadem Sameni, Vaughan (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 147 days.

(21) Appl. No.: 11/856,729

(22) Filed: Sep. 18, 2007

(65) Prior Publication Data

US 2009/0076644 A1 Mar. 19, 2009

(51) Int. Cl.
*B29C 45/00* (2006.01)
(52) U.S. Cl. ............ 700/202; 700/204; 264/40.6; 425/143
(58) Field of Classification Search ........... 700/29, 700/42, 166, 200, 202, 204; 264/40.1, 40.6; 425/143, 145
See application file for complete search history.

(56) References Cited

U.S. PATENT DOCUMENTS 4,988,273 A * 1/1991 Faig et al. ............ 425/145
5,043,862 A 8/1991 Takahashi et al.
5,173,224 A 12/1992 Nakamura et al.
5,456,870 A * 10/1995 Bulgrin ............ 264/40.6
5,551,857 A 9/1996 Fujioka et al.
5,997,778 A 12/1999 Bulgrin
6,529,796 B1 * 3/2003 Kroeger et al. ............ 700/202
7,151,978 B2 * 12/2006 Giannini ............ 700/204
7,245,986 B2 * 7/2007 Katsuta et al. ............ 700/204
7,418,992 B2 * 9/2008 Pilavdzic ............ 164/154.1

FOREIGN PATENT DOCUMENTS

CA 2379616 2/2001
CA 2544666 12/2005

* cited by examiner

*Primary Examiner*—Albert DeCady
*Assistant Examiner*—Douglas S Lee
(74) *Attorney, Agent, or Firm*—Husky Intellectual Property Services (57) ABSTRACT

There are provided a method of operating a temperature management device. For example, there is disclosed a method of operating a temperature management device. The method comprises transmitting towards the temperature management device a probe, the probe having a pre-determined format; receiving a probe response, the probe response being representative of at least one dynamic operational characteristic of the temperature management device; analyzing the probe response to obtain a control parameter suitable for controlling operation of the temperature management device.

24 Claims, 5 Drawing Sheets

METHOD OF OPERATING A TEMPERATURE MANAGEMENT DEVICE

FIELD OF THE INVENTION

The present invention generally relates to, but is not limited to, temperature management devices, and more specifically the present invention relates to, but is not limited to, a method of operating a temperature management device.

BACKGROUND OF THE INVENTION

Temperature management devices, such as heaters and air conditioners are used in many areas of modern life. One example of an area where temperature management devices are extensively used is the area of injection molding. Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

Within a typical molding system, a number of temperature management devices are used. For example, a barrel of an injection unit can be associated with one or more heaters for maintaining a desired temperature for plasticizing resin pellets (or other type of raw material) into melt having consistency suitable for injection into a molding cavity. A melt distribution network, also referred to sometimes as a "hot runner", also utilizes one or more heaters to maintain the melt within the melt distribution network at the desired temperature during distribution of the melt between the injection unit and a given molding cavity of a multi-cavity mold.

In some implementations, an air conditioner and/or a dehumidifier can be used for maintaining a desired ambient temperature, for example, to prevent condensation occurring within the molding machine, when the molding machine is operated in certain regions of the world where the ambient humidity makes operation of the injection molding system susceptible to condensation.

The temperature management devices used within molding machines can be broadly divided into two categories: a multi-zone temperature management device and a single-zone temperature management device. Taking an example of a barrel heater for the injection unit, the barrel heater can have multiple control zones in the sense that a temperature setting of each control zone can be set and controlled independently of the temperature setting in other control zones. On the other hand, the barrel heater can be of a single-zone control type. Within this scenario, a single setting can be associated with the whole barrel heater disposed along the whole or part of the barrel.

Irrespective of the type of the temperature management device, inability to accurately control the temperature settings of the temperature management device can have undesirable consequences. Again, taking the example of the barrel heater, inability to precisely control the temperature setting can have multiple undesirable effects. For example, if the barrel heater maintains a temperature that is below the desired temperature, the resin will not reach the required molten state and will result in parts of undesired quality or in failure of the molding machine altogether. On the other hand, if the barrel heater maintains temperature which is above the required temperature, the resin can degrade which can leave undesirable marks on the parts (i.e. blemishes) or render the resin batch unusable altogether.

U.S. Pat. No. 5,173,224 issued to Nakamura et al. on Dec. 22, 1992 discloses a fuzzy inference thermocontrol method for an injection molding machine with a Proportional-Integral-Differential (PID) control. The disclosed system allows to perform automatic PID control corresponding a status of an injection molding machine for eliminating a temperature overshoot or an undershoot during thermocontrol of thermocontrolled components of the injection molding machine, the Fuzzy Control theory is used for controlling the injection molding machine. By using the Fuzzy Control system, the object temperature of the thermocontrolled components can be attained with practically eliminated overshoot and undershoot.

U.S. Pat. No. 5,043,862 issued to Takahashi et al. on Aug. 27, 1991 discloses a PID control method and PID controller for determining, from a control response from a process, characteristic values representative of controllability and automatically deriving and setting PID constants from the determined characteristic values. The error between a set point and a controlled value is decided as to whether to be due to a change in set point or due to a disturbance, and PID constants are set on the basis of results of decision.

U.S. Pat. No. 5,551,857 issued to Fujioka et al. on Sep. 3, 1996 discloses a cylinder temperature controller for an injection molding machine in which an injection molding operation is performed while keeping the injection cylinder at a stable preset temperature regardless of disturbances such as the change of mold temperature or ambient temperature and the temperature rise caused by the shear compression of resin. A temperature regulator for carrying out PID feedback control of the injection cylinder temperature is provided with a PID adjusting means unit for automatic tuning. The actual temperature T of each portion of the injection cylinder is detected by a thermocouple. When the actual temperature T deviates from a predetermined temperature range defined by an upper limit [A+B] and lower limit [A−B] which are set on the basis of the preset target temperature A, an automatic tuning command is outputted to the temperature regulator. Upon receipt of this command, the PID adjusting unit sets the PID parameters again at a value suitable to the disturbance. By keeping the PID parameters to be suitable to the disturbance, the actual temperature T of each portion of the cylinder agrees with the preset target temperature A regardless of the change of the disturbance.

U.S. Pat. No. 5,997,778 issued to Bulgrin on Dec. 7, 1999 discloses an injection molding machine uses a summed, multi-term control law to control ram velocity during the injection stroke of a molding cycle to emulate a user set velocity profile. An automatic calibration method sets no load ram speeds to duplicate user set ram speeds. Finite impulse response filters produce open loop, no load control signals at advanced positions on the velocity profile to account for lag in system response. An adaptive, error term indicative of load disturbance, observed from a preceding cycle is added at the advanced travel position predicted by the finite impulse response filter to produce a predictive open loop, load compensated control signal. Finally, an auto tuned PID controller develops a real time, feedback load disturbance signal summed with the open loop control signal to produce a drive signal for the machine's proportioning valve.

SUMMARY OF THE INVENTION

According to a first broad aspect of the present invention, there is provided a method of operating a temperature management device. The method comprises transmitting towards the temperature management device a probe, the probe having a pre-determined format; receiving a probe response, the probe response being representative of at least one dynamic operational characteristic of the temperature management device; analyzing the probe response to obtain a control parameter suitable for controlling operation of the temperature management device.

According to a second broad aspect of the present invention, there is provided a computing apparatus configured to be coupled to a controller of a temperature management device. The computing apparatus is configured to transmit to the controller a probe, the probe having a pre-determined format; to receive from the controller a probe response, the probe response indicative of at least one dynamic operational characteristic of the temperature management device; and to analyze the probe response to obtain a control parameter suitable for enabling the controller to control operation of the temperature management device.

According to a third broad aspect of the present invention, there is provided a controller of a temperature management device. The controller is configured to receive a probe, the probe having a pre-determined format; responsive to the probe, to appreciate a probe response, the probe response indicative of at least one dynamic operational characteristic of the temperature management device, the probe response for enabling determining of a control parameter suitable for enabling the controller to control operation of the temperature management device.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the exemplary non-limiting embodiments along with the following drawings, in which.

The drawings are not necessarily to scale and may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 1:
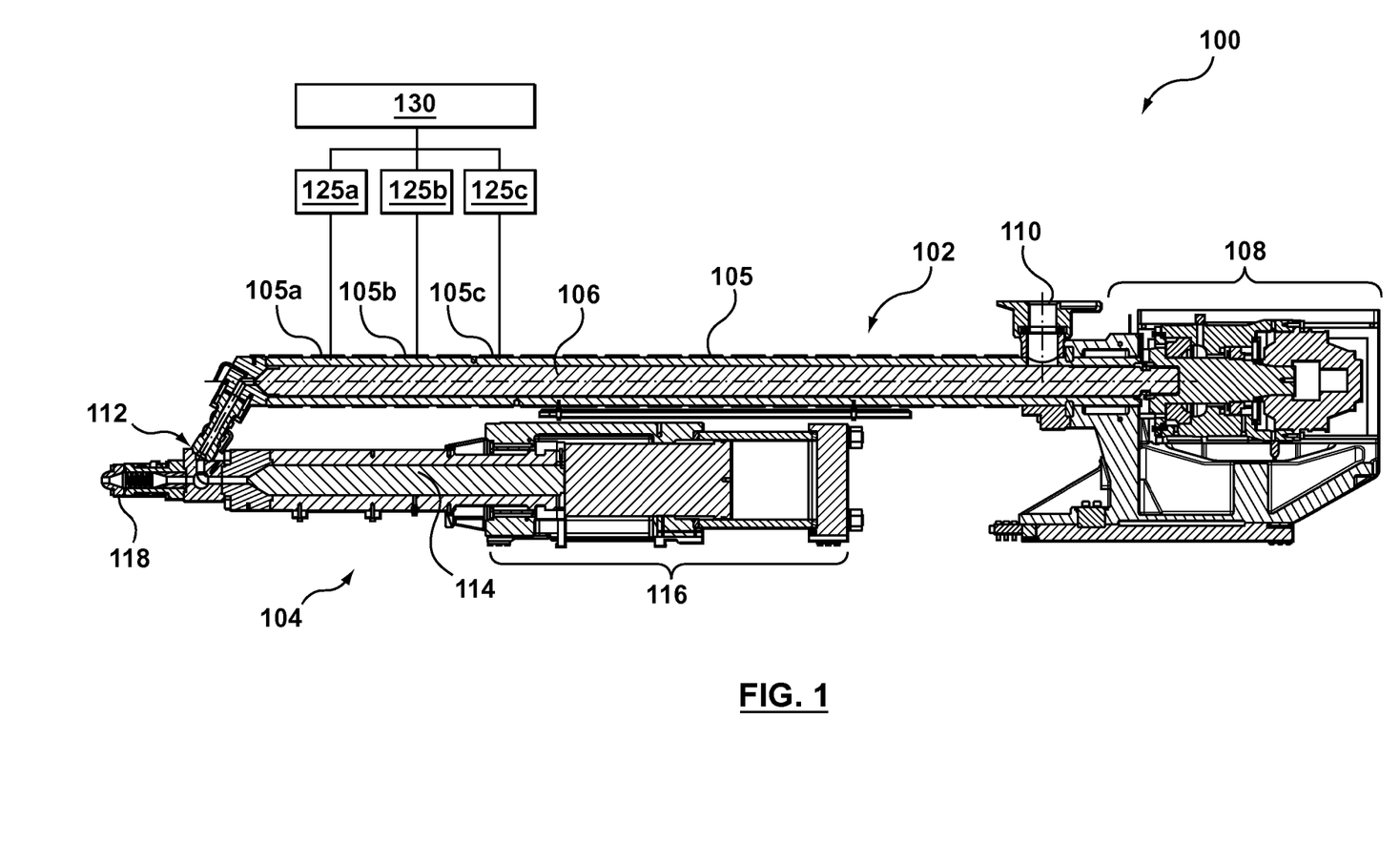
FIG. 1 is a cross-section view of a portion of an injection unit having a plurality of heaters that can implement the method of operating a temperature management device, according to a non-limiting embodiment of the present invention.

With reference to FIG. 1, there is depicted an injection unit 100 that can be configured to implement embodiments of the present invention. The injection unit 100 is of a two-stage type and to that extent, the injection unit 100 comprises a barrel 102 and a shooting pot 104. Within the barrel 102, there is provided a screw 106 which is actuated by a screw actuator 108. Within these embodiments of the present invention, the screw actuator 108 imparts rotational and reciprocal movements to the screw 106. The barrel 102 is associated with a plurality of barrel heaters 105. It should be noted that the number of or construction of the plurality of barrel heaters 105 is not particularly limited and those skilled in the art will readily appreciate a number of alternative implementations for the plurality of barrel heaters 105.

Combination of the rotation of the screw 106 and the heat emitted by the plurality of barrel heaters 105 causes raw material fed through an inlet 110 to melt until a desired amount of material at a desired molten state has been produced and accumulated in front of the screw 106. Accumulation of the desired amount of material in front of the screw 106 causes the screw 106 to translate backwardly (i.e. in the right-bound direction if viewed in FIG. 1).

The desired amount of material is then transferred into the shooting pot 104 via a transfer portion 112 by means of reciprocal movement of the screw 106. Suitable configurations of the transfer portion 112 are well known to those of skill in the art and, as such, need not be described here at any length. The shooting pot 104 includes a plunger 114 which is actuated by a plunger actuator 116. The plunger actuator 116 impacts a lateral movement to the plunger 114, which causes the accumulated desired amount of material to be transferred into a mold (not depicted) via a nozzle 118.

Within these non-limiting embodiments of the present invention, the plurality of barrel heaters 105 are divided into multiple control zones that can be separately and independently controlled to assist in reaching the desired consistency of the melt. However, in alternative non-limiting embodiments of the present invention, the plurality of barrel heaters 105 can be grouped into a single control zone. For the purposes of the example to be presented herein below, three instances of the plurality of barrel heaters 105 will be used: a first barrel heater 105a, a second barrel heater 105b and a third barrel heater 105c, each being associated with a separate control zone.

It should be expressly understood that the description of the injection unit 100 and the plurality of barrel heaters 105, in particular, is provided as just one example of a temperature management device that can be controlled using teachings of embodiments of the present invention. Those of skill in the art, once teachings of the embodiments of the present invention are appreciated, will be able to modify these teachings to control other types of temperature management devices. Examples of other temperature management devices that can be controlled using teachings of the embodiments of the present invention include, but are not limited to, heaters of a melt distribution network (i.e. the hot runner heaters), heaters associated with other types of molding equipment (ex. a single stage reciprocating screw type barrel for an injection molding machine, extruder heaters for an extrusion molding machine, etc.), heaters associated with pipes for conveying fluids (such as oil), air conditioners, dehumidifiers and the like.

Within the architecture of FIG. 1, each of the first barrel heater 105a, the second barrel heater 105b and the third barrel heater 105c is associated with a respective heater controller—a first barrel heater controller 125a, a second barrel heater controller 125b and a third barrel heater controller 125c. Generally speaking, the purpose of the first barrel heater controller 125a, the second barrel heater controller 125b and the third barrel heater controller 125c is to execute one or more control routines suitable for controlling operation of the respective one of the first barrel heater 105a, the second barrel heater 105b and the third barrel heater 105c.

Some examples of control routines that can be executed by the first barrel heater controller 125a, the second barrel heater controller 125b and the third barrel heater controller 125c include, but are not limited to: (i) controlling a temperature setting of the respective one of the first barrel heater 105a, the second barrel heater 105b and the third barrel heater 105c; (ii) appreciating an operational parameter associated with the respective one of the first barrel heater 105a, the second barrel heater 105b and the third barrel heater 105c, etc.

For example, each of the first barrel heater controller 125a, the second barrel heater controller 125b and the third barrel heater controller 125c can be associated with a thermocouple (not depicted) for measuring temperature associated with the respective one of the first barrel heater 105a, the second barrel heater 105b and the third barrel heater 105c.

In some embodiments of the present invention, each of the first barrel heater controller 125a, the second barrel heater controller 125b and the third barrel heater controller 125c can be implemented as a Proportional-Integral-Differential (PID) type controller. Accordingly, within these embodiments of the present invention, each of the first barrel heater controller 125a, the second barrel heater controller 125b and the third barrel heater controller 125c can be configured to control temperature setting of the respective one of the first barrel heater 105a, the second barrel heater 105b and the third barrel heater 105c based on a control parameter, which in this specific example includes three constants, generally referred to by those of skill in the art as a $K_I$ (integral gain), $K_P$ (proportional gain) and $K_D$ (derivative gain).

However, in alternative non-limiting embodiments of the present invention, each or some of the first barrel heater controller 125a, second barrel heater controller 125b and the third barrel heater controller 125c can be implemented as different type of a heater controller. Some examples of alternative implementations of the heater controller may include, but are not limited to, Proportional-Differential type controller, Proportional type controller and the like.

Also, there is provided a computing apparatus 130 operatively coupled to the first barrel heater controller 125a, the second barrel heater controller 125b and the third barrel heater controller 125c. This connection between the computing apparatus 130 and the first barrel heater controller 125a, the second barrel heater controller 125b and the third barrel heater controller 125c can be implemented using any suitable means, such as a wired connection, a wireless connection, a combination of the two, a local area network, a wide area network and the like.

In some embodiments of the present invention, the computing apparatus 130 can be a general purpose computer configured for implementing embodiments of the present invention. In other embodiments of the present invention, functionality of the computing apparatus 130 can be incorporated into functionality of a controller of a molding machine (not depicted) that incorporates, in use, the injection unit 100. In yet further embodiments of the present invention, the functionality of the computing apparatus 130 can be incorporated into one of the first barrel heater controller 125a, the second barrel heater controller 125b and the third barrel heater controller 125c or, alternatively, it can be distributed between some or all of the first barrel heater controller 125a, the second barrel heater controller 125b and the third barrel heater controller 125c.

In yet further non-limiting embodiments of the present invention, the functionality of the computing apparatus 130 can be incorporated into one of the first barrel heater 105a, the second barrel heater 105b and the third barrel heater 105c or, alternatively, it can be distributed between some or all of the first barrel heater 105a, the second barrel heater 105b and the third barrel heater 105c. Within these embodiments of the present invention, the first barrel heater controller 125a, the second barrel heater controller 125b and the third barrel heater controller 125c can be omitted, or alternatively, their functionality can be incorporated into functionality of the controller of the molding machine (not depicted) that incorporates the first barrel heater 105a, the second barrel heater 105b and the third barrel heater 105c.

Figure 2:
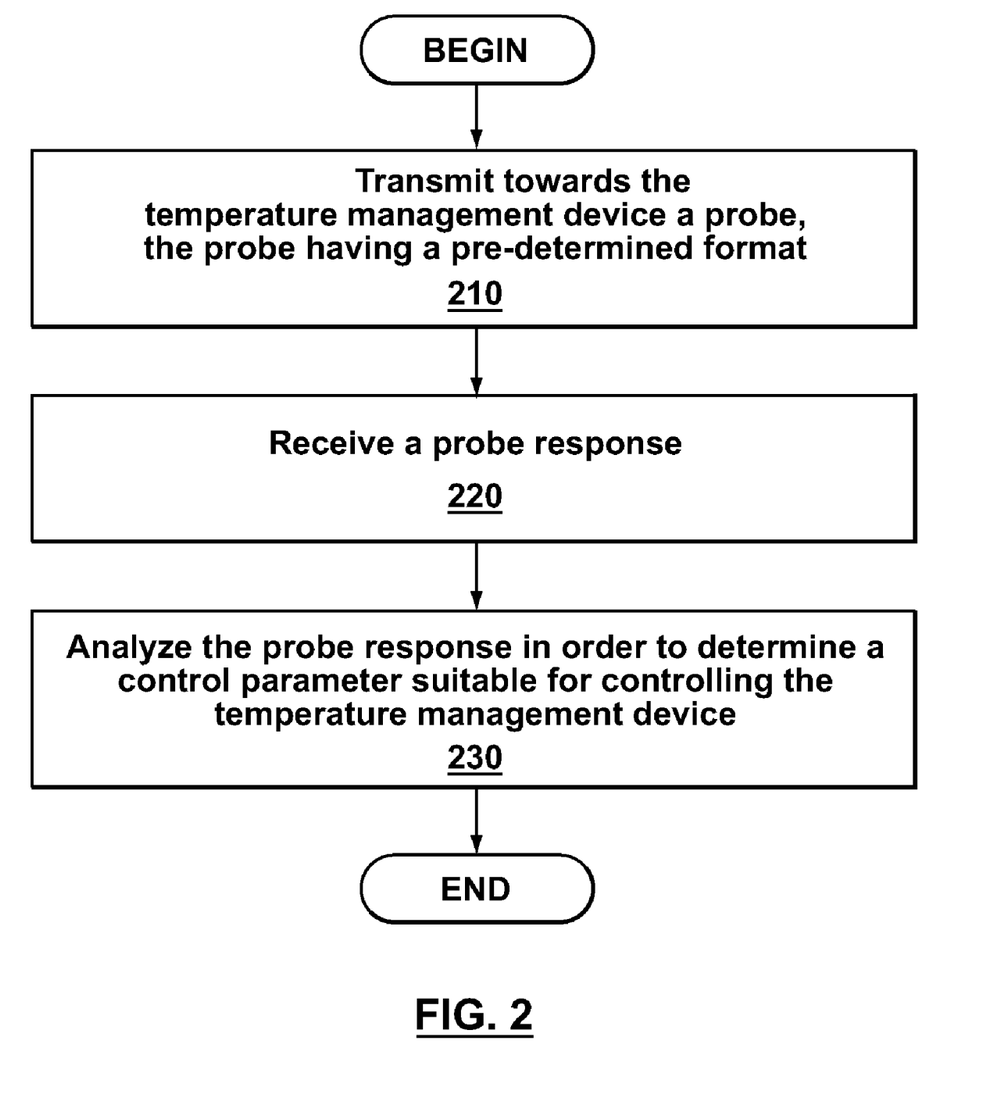
FIG. 2 is a block diagram depicting a flow chart of a method for operating a temperature management device, such as the injection unit of FIG. 1, according to a non-limiting embodiment of the present invention.

Given the architecture described with reference to FIG. 1, it is possible to implement a method of operating a temperature management device (such as the plurality of barrel heaters 105, etc.). With reference to FIG. 2, a non-limiting embodiment of a method of operating a temperature management device will now be described in greater detail. The method of FIG. 2 can be conveniently executed by the computing apparatus 130.

Step 210

The method begins at step 210, where the computing apparatus 130 transmits towards the temperature management device a probe, the probe having a pre-determined format. Within the specific non-limiting embodiment being described herein, the computing apparatus 130 transmits a first probe to the first barrel heater controller 125a, a second probe to the second barrel heater controller 125b and a third probe to the third barrel heater controller 125c.

The computing apparatus 130 first determines a respective pre-determined format of the first probe, the second probe and the third probe. In some embodiments of the present invention, the computing apparatus 130 can calculate an individual value for each of the pre-determined formats for the first probe, the second probe and the third probe. Based on the specific operating parameters, the so-calculated individual values can be the same or different.

For the purposes of simplifying description to be presented herein below, an example of the first probe and the first barrel heater controller 125a will be used to describe how the computing apparatus 130 can determine the pre-determined format associated with the first probe. It should be expressly understood that determination of the pre-determined format associated, respectively, with the second probe and the third probe can be executed in substantially the same manner.

In some embodiments of the present invention, the pre-determined format of the first probe can be a pre-determined pattern. In a specific non-limiting embodiment of the present invention, the pre-determined pattern can be a square wave pattern and can govern the frequency and amplitude of fluctuation of a duty cycle setting conveyed to the first barrel heater 105a by the first barrel heater controller 125a.

In some embodiments of the present invention, the pre-determined format of the first probe can be associated with the following probe parameter:

a. $A_{RANGE}$=[10% ... 80%]

Within this specific example, the probe parameters associated with the pre-determined format can be indicative of the probe that will cause the first barrel heater controller 125a to change the duty cycle setting for the first barrel heater 105a. More specifically, within a first instance in time, assuming that at the first instance in time, the temperature associated with the first barrel heater 105a is under the set point, the first barrel heater controller 125a will set the duty cycle for the first barrel heater 105a to 80%. At a second instance in time, which substantially coincides with the temperature associated with the first barrel heater 105a reaching the set point, the first barrel heater controller 125a will set the duty cycle to 10%. The cycle can then be repeated within the range of the $A_{RANGE}$ control parameter. In other words, a change of duty cycle setting within the $A_{RANGE}$ control parameter is triggered when a temperature associated with the temperature management device (such as the first barrel heater 105a, the second barrel heater 105b and the third barrel heater 105c) reaches a set point.

In alternative embodiments of the present invention, the pre-determined format of the first probe can be associated, as an example only, with the following probe parameters:

$A_{RANGE}$=[10% ... 80%]
$V_{FREQUENCY}$=1.2 seconds

Within this specific example, the probe parameters associated with the pre-determined format can be indicative of the probe that will cause the first barrel heater controller 125a to change the duty cycle setting for the first barrel heater 105a every 1.2 seconds. More specifically, within a first instance in time, the first barrel heater controller 125a will set the duty cycle for the first barrel heater 105a to 10%. At a second instance in time, 1.2 seconds after the first instance in time, the first barrel heater controller 125a will set the duty cycle to 80%. The cycle can then be repeated within the range of the $A_{RANGE}$ control parameter.

Within these embodiments of the present invention, the computing apparatus 130 can first determine the probe parameters ($A_{RANGE}$, $V_{FREQUENCY}$) or the probe parameter probe parameters ($A_{RANGE}$) for the first barrel heater 105a. In a specific implementation of this embodiment of the present invention, the computing apparatus 130 can determine the probe parameters in the following manner.

In some embodiments of the present invention, the computing apparatus 130 determines the $A_{RANGE}$ value in the following manner. The computing apparatus 130 can access a table (not depicted) maintained within memory (not depicted) of the computing apparatus 130, the table (not depicted) mapping a given temperature management device (ex. the first barrel heater 105a) to a corresponding range of values for $A_{RANGE}$. The table (not depicted) can be populated by performing empirical analysis prior to executing the method of FIG. 2 or by deploying any other suitable means. For example, the table can be populated based on a safe range of duty cycle settings for the given temperature management device (ex. the first barrel heater 105a). In some embodiments of the present invention, the table is further populated based on the responsiveness of the given temperature management device (ex. the first barrel heater 105a) to the duty cycle variations and/or based on thermal mass of the given temperature management device (ex. the first barrel heater 105a).

The computing apparatus 130 can also determine the probe parameter ($V_{FREQUENCY}$). The computing apparatus 130 can cause the first barrel heater controller 125a to turn the first barrel heater 105a on and keep the first barrel heater 105a on until a set point is reached (i.e. when the temperature associated with the first barrel heater 105a reaches the set point). When the set point is reached, the computing apparatus 130 causes the first barrel heater controller 125a to turn the first barrel heater 105a off. At this point, as is well known to those skilled in the art, the temperature associated with the first barrel heater 105a will continue to rise for a certain period of time (process known as "overshooting") and will then start dropping towards the set point (and, potentially, beyond).

The computing apparatus 130 can measure time interval that elapses between a point in time when the first barrel heater 105a is turned off and when the temperature returns to the set point. The computing apparatus 130 can use this time interval as the value for the $V_{FREQUENCY}$.

Computing apparatus 130 can perform substantially the same steps and/or routines determining the predetermined format for the second probe for the second barrel heater controller 125b and the third probe for the third barrel heater controller 125c. The steps and/or routines can be performed substantially simultaneously, substantially concurrently or one after another.

How the probe(s) having the pre-determined format is (are) transmitted to the temperature management device (ex. the first barrel heater 105a, the second barrel heater 105b and the third barrel heater 105c) is not particularly limited. In some embodiments of the present invention, the computing apparatus 130 transmits the probe(s) to a controller of the temperature management device (ex. the first barrel heater controller 125a, the second barrel heater controller 125b and the third barrel heater controller 125c) as an electric wave signal. In those embodiments of the present invention, where the probe has a pre-determined format representative of duty cycle changes, each of the first barrel heater controller 125a, the second barrel heater controller 125b and the third barrel heater controller 125c can, responsive to receipt of the probe, control a respective heater circuit (not depicted), such as for example, a heater circuit incorporating a solid state relay, etc., to turn the respective first barrel heater 105a, the second barrel heater 105b and the third barrel heater 105c on and off, as per the duty cycle setting.

In alternative non-limiting embodiments of the present invention, the probe can be implemented in a different form factor, such as, as a digital signal, as a packet of data and the like.

Step 220

Next, at step 220, the computing apparatus 130 receives a probe response. Within the specific example being presented herein, the computing apparatus 130 receives three probe responses, namely:

(i) a first probe response responsive to the first probe transmitted to the first barrel heater controller 125a;
(ii) a second probe response responsive to the second probe transmitted to the second barrel heater controller 125b;
(iii) a third probe response responsive to the third probe transmitted to the third barrel heater controller 125c.

It will be recalled that the first probe, the second probe and the third probe transmitted as part of step 210 are associated with the respective pre-determined or, in other words, known format. Since the first probe response, the second probe response and the third probe response are based on the known first probe, second probe and third probe, respectively, they can be said to be reflective of one or more dynamic operational characteristics associated with the first barrel heater 105a, the second barrel heater 105b and the third barrel heater 105c.

Examples of such dynamic operational characteristics include, but are not limited to:
- resistance associated with a given one of the first barrel heater 105a, the second barrel heater 105b and the third barrel heater 105c;
- nominal power associated with the given one of the first barrel heater 105a, the second barrel heater 105b and the third barrel heater 105c
- convection and conduction coefficients associated with the given one of the first barrel heater 105a, the second barrel heater 105b and the third barrel heater 105c;
- effective convection surface areas associated with the given one of the first barrel heater 105a, the second barrel heater 105b and the third barrel heater 105c; and
- temperature of surrounding air around the given one of the first barrel heater 105a, the second barrel heater 105b and the third barrel heater 105c.

Naturally, it should be appreciated that the list presented above was meant as an example only. The probe responses can be representative of some or all of these dynamic operational characteristics, as well as a number of additional or substitute dynamic operational characteristics. In any case, since the probe responses are based on probes having pre-determined formats, variations in the probe responses can be said to be attributable exclusively to variations in dynamic operational characteristics. For the avoidance of doubt, it should be expressly understood that some of the dynamic operational characteristics may change and some of the dynamic operational characteristics may stay constant over the operational cycle of the temperature management device (such as the first barrel heater 105a, the second barrel heater 105b and the third barrel heater 105c).

In the specific example being presented herein, the first probe response, the second probe response and the third probe response can be implemented as temperature readings associated with the first barrel heater 105a, the second barrel heater 105b and the third barrel heater 105c, respectively. Recalling that the pre-determined format can take the form of varying duty cycle settings, the temperature readings associated with the first barrel heater 105a, the second barrel heater 105b and the third barrel heater 105c will oscillate in line with changes in the duty cycle settings.

Further recalling that the first barrel heater controller 125a, the second barrel heater controller 125b and the third barrel heater controller 125c can be each associated with a thermocouple (not depicted), appreciation of the first probe response, the second probe response and the third prove response can be implemented by means of the computing apparatus 130 receiving a temperature reading from a respective one of the first barrel heater controller 125a, the second barrel heater controller 125b and the third barrel heater controller 125c.

Step 230

Next, at step 230, the computing apparatus 130 analyzes the probe response received as part of step 220 in order to determine a control parameter suitable for controlling the temperature management device. In the specific example being presented herein, the computing apparatus 130 analyzes the first probe response, the second probe response and the third probe response in order to determine a first control parameter, a second control parameter and a third control parameter suitable for controlling, respectively, the first barrel heater 105a, the second barrel heater 105b and the third barrel heater 105c.

Recalling that the first barrel heater controller 125a, the second barrel heater controller 125b and the third barrel heater controller 125c can be implemented as PID controllers, the computing apparatus 130 can determine respective $K_I$ (integral gain), $K_P$ (proportional gain), $K_D$ (derivative gain) values for each of the first barrel heater controller 125a, the second barrel heater controller 125b and the third barrel heater controller 125c.

In a non-limiting example of implementation of step 230, the computing apparatus 130 can first determine an average peak value ($A_{PEAK}$) and an average frequency value ($A_{FREQUENCY}$) of the fluctuation of the probe response (which within this example represents fluctuation in temperature responsive to the duty cycle fluctuation).

Figure 3:
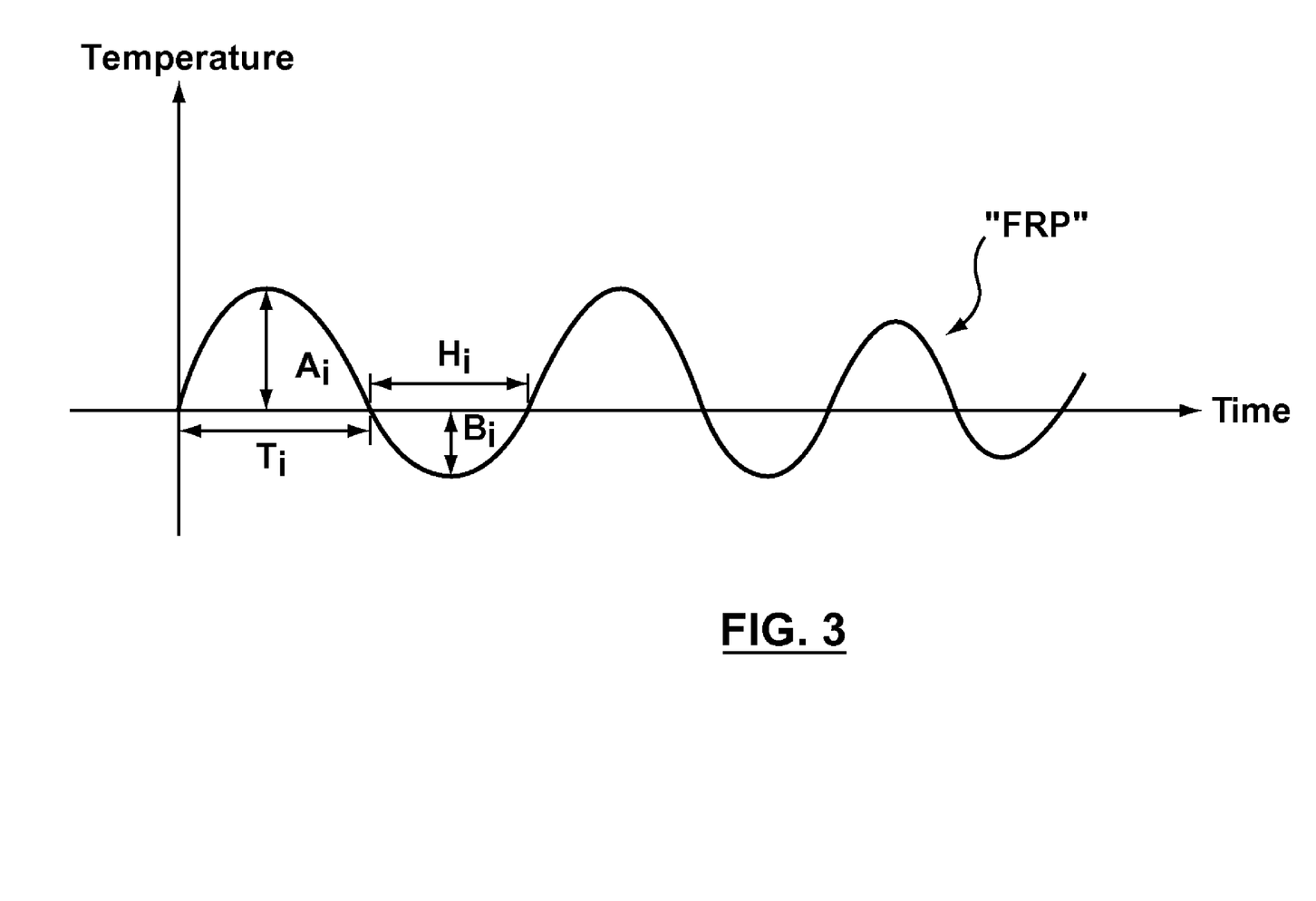
FIG. 3 is a schematic diagram schematically depicting a probe response received as part of the method of FIG. 2.

With reference to FIG. 3, which schematically depicts a curve that represents the first response parameter ("FRP"), the computing apparatus 130 can perform the following calculations:

$$A_{PEAK} = \frac{1}{N}\sum_{i=1}^{N} A_i + \frac{1}{M}\sum_{i=1}^{M} B_i$$

where:
- $A_i$ represents amplitude of fluctuation of the temperature above the set point; and
- $B_i$ represents amplitude of fluctuation of the temperature below the set point.

$$A_{FREQUENCY} = \frac{1}{N}\sum_{i=1}^{N} T_i + \frac{1}{M}\sum_{i=1}^{M} H_i$$

where:
- $T_i$ represents a time interval it takes for the first barrel heater 105a to react to the first duty cycle setting; and
- $H_i$ represents a time interval it takes for the first barrel heater 105a to react to the second duty cycle setting.

In some embodiments of the present invention, the computing apparatus 130 can repeat the steps of re-calculating the average peak value ($A_{PEAK}$) and the average frequency value ($A_{FREQUENCY}$) until a pre-determined validation parameter is satisfied. In some embodiments of the present invention, the computing apparatus 130 can calculate a validation parameter, for each of the values $A_I$, $B_I$, $T_I$, $H_I$.

The computing apparatus 130 can calculate a respective validation parameter (VALIDATION$_1$, VALIDATION$_2$, VALIDATION$_3$ and VALIDATION$_4$) based on the following formula:

$$VALIDATION_1 = \frac{1}{N}\sum_{i=1}^{N} (A_{i+1} - A_i)^2$$

$$VALIDATION_2 = \frac{1}{M}\sum_{i=1}^{M} (B_{i+1} - B_i)^2$$

$$VALIDATION_3 = \frac{1}{N}\sum_{i=1}^{N} (T_{i+1} - T_i)^2$$

$$VALIDATION_4 = \frac{1}{M}\sum_{i=1}^{M} (H_{i+1} - H_i)^2$$

Based on the so-calculated validation parameters, the computing apparatus 130 can determine when to stop re-calculating the average peak value ($A_{PEAK}$) and the average frequency value ($A_{FREQUENCY}$). In some embodiments of the present invention, the computing apparatus 130 continues to re-calculate the average peak value ($A_{PEAK}$) and the average frequency value ($A_{FREQUENCY}$) until the so-calculated validation parameters are substantially convergent therebetween.

In alternative non-limiting embodiments of the present invention, the computing apparatus 130 continues to re-calculate the average peak value ($A_{PEAK}$) and the average frequency value ($A_{FREQUENCY}$) until some or all of the so-calculated validation parameters are above or below a pre-determined threshold (which can be, for example, empirically determined). In yet further non-limiting embodiments of the present invention, the computing apparatus 130 continues to re-calculate the average peak value ($A_{PEAK}$) and the average frequency value ($A_{FREQUENCY}$) until the so-calculated validation parameters are substantially convergent therebetween with some or all of the so-calculated validation parameters are above or below the pre-determined threshold.

The computing apparatus 130 then proceeds to determine the respective $K_I$ (integral gain), $K_P$ (proportional gain), $K_D$ (derivative gain) values for each of the first barrel heater controller 125a, the second barrel heater controller 125b and the third barrel heater controller 125c based on the respective the average peak value ($A_{PEAK}$) and the average frequency value ($A_{FREQUENCY}$).

In some embodiments of the present invention, the computing apparatus 130 utilizes the following formula to perform calculations:

$$K_P = K_{PI} * (A_{MAX} - A_{MIN}) A_{PEAK}$$

$$K_I = K_{CI} * K_P * T / A_{FREQUENCY}$$

$$K_D = K_{DI} * K_P * A_{FREQUENCY}$$

where, $A_{MAX} - A_{MIN}$ are values within the $A_{RANGE}$ or, in this example 80 and 10;

$K_{PI}$, $K_{CI}$, $K_{DI}$ are constant values, determined according to standard known methods; and T is a time interval over which the computing apparatus 130 performs calculations and/or appreciate operational parameters (such as temperature), also known as "controller sample time".

The computing apparatus 130 then transmits an indication of the first control parameter, the second control parameter and the third control parameter to the first barrel heater controller 125a, the second barrel heater controller 125b and the third barrel heater controller 125c to enable them to control operation of the first barrel heater 105a, the second barrel heater 105b and the third barrel heater 105c, respectively. Within the specific example being presented herein, the computing apparatus 130 transmits a respective indication of a respective set of $K_I$ (integral gain), $K_P$ (proportional gain), $K_D$ (derivative gain) values for each of the first barrel heater controller 125a, the second barrel heater controller 125b and the third barrel heater controller 125c.

In some embodiments of the present invention, computing apparatus 130 can execute the method of FIG. 2 at a start up of the temperature management device (for example, at a start up of a molding machine that incorporates the injection unit 100, etc). In alternative non-limiting embodiments, the method of FIG. 2 can be executed as a self-tuning process by the computing apparatus 130, for example, when a pre-determined trigger is satisfied. An example of the pre-determined trigger can include, but is not limited to, the computing apparatus 130 sensing that difference between some or all of the operating parameters (such as temperature, for example) of the first barrel heater 105a, the second barrel heater 105b and the third barrel heater 105c is above or below a pre-determined value.

Figure 4:
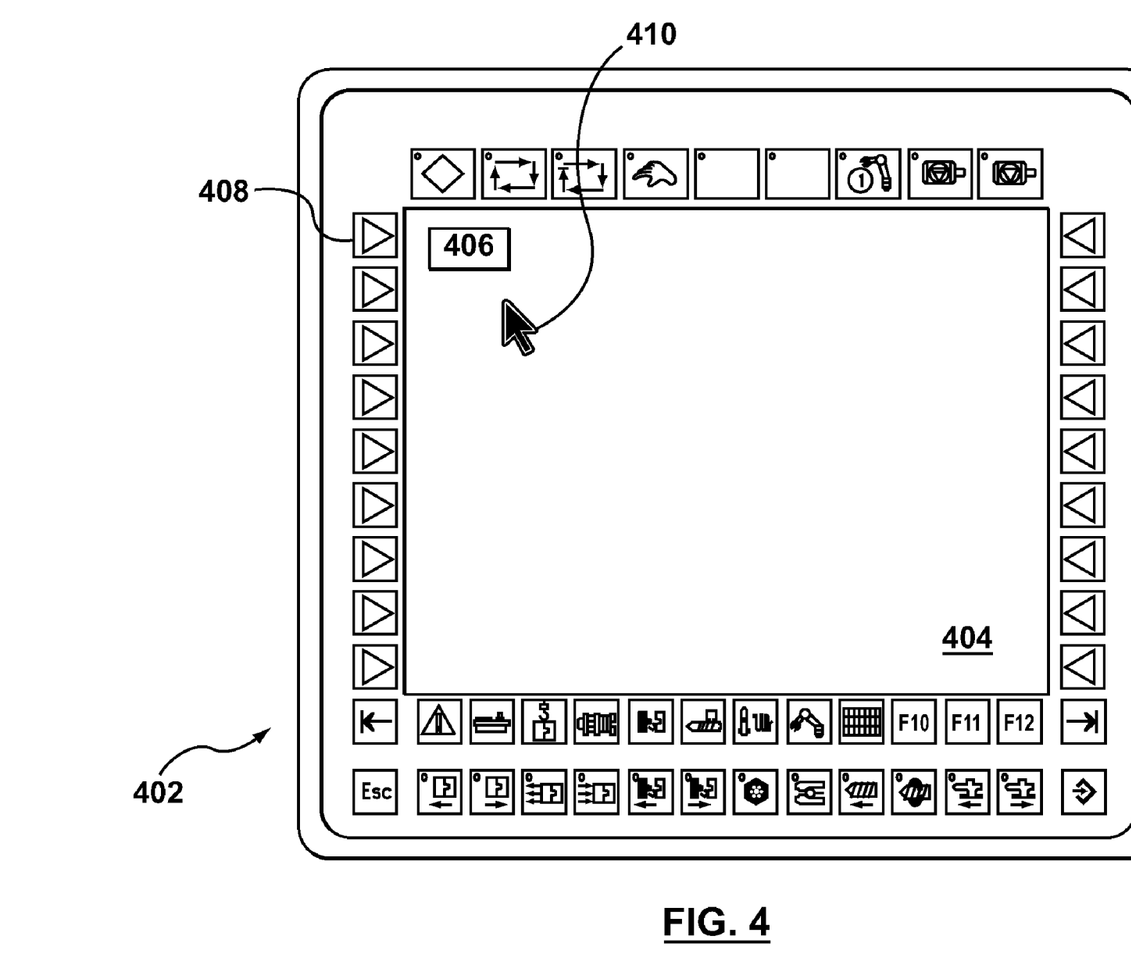
FIG. 4 depicts a Human-Machine Interface that can be used to trigger execution of the method of FIG. 2, according to a non-limiting embodiment of the present invention.

In yet further non-limiting embodiments of the present invention, the method of FIG. 2 can be executed on-demand. For example, with reference to FIG. 4, a non-limiting embodiment of how the method of FIG. 2 can be triggered, will now be described in greater detail. FIG. 4 depicts a non-limiting embodiment of a Human-Machine Interface 402 or, simply, HMI 402, which can be adapted to implement embodiments of the present invention.

The HMI 402 can be part of or be coupled to the computing apparatus 130. For example, in those embodiments of the present invention where the computing apparatus 130 is implemented separately from the controller of the molding machine (not depicted) that incorporates, in use, the injection unit 100, the HMI 402 can be implemented as part of the controller of the molding machine (not depicted) and the computing apparatus 130 can implement a communication link with the controller of the molding machine (not depicted). In those embodiments of the present invention where the computing apparatus 130 is implemented as part of the controller of the molding machine (not depicted) this link to the HMI 402 can be an internal communication link (such as, for example, computer bus or the like). Other configurations are, of course, possible.

Generally speaking, the purpose of the HMI 402 is to display information to an operator and receive commands from the operator. To that extent, there is provided a first interface 404, which can be a screen. The first interface 404 is used to provide information to the operator. Alternatively, the first interface 404 can be touch-screen and, as such, can be used for both providing information to the operator, as well as receiving commands from the operator. Also, there is provided a second interface 408, which can be a selection of actuators, such as buttons, pointing devices and the like. The second interface 408 can be used for receiving commands from the operator.

The first interface 404 can be configured to provide an actuating entity 406 (which can be a link, a button, an icon or any other entity being capable of being selected) to enable the operator to trigger execution of the method of FIG. 2. In a specific non-limiting embodiment, the actuating entity 406 comprises an icon with a representation of the following text "Perform Heater Self-Tuning" or any conceivable variant thereof. The operator can actuate the actuating entity 406 by using the first interface 404 (if the first interface 404 comprises a touch screen) or the second interface 408. Alternatively, the operator can actuate the actuating entity 406 by using a pointing entity 410, which can be moved by any suitable known means. When the actuating entity 406 is actuated, it can trigger execution of the method of FIG. 2 according to various embodiments of the present invention.

A technical effect of embodiments of the present invention may include ability to execute a tuning process for a temperature management device substantially in real-time (i.e. without having to stop operation of the temperature management device). Another technical effect of embodiments of the present invention may include decreased or eliminated down time attributable to a tuning process that no longer requires putting the temperature management device off-line. Another technical effect of embodiments of the present invention may include ability to tune multiple temperature management devices substantially simultaneously or substantially concurrently. It should be noted that not every technical effect needs to be realized, in its entirety, in each and every embodiment of the present invention.

At least some of these technical effects can be illustrated with reference to FIG. 5, which is a schematic diagram depicting a duty cycle fluctuation, a set point and a temperature associated with a temperature management device (ex. the first barrel heater 105a, the second barrel heater 105b and the third barrel heater 105c) before, during and after execution of the method of FIG. 2.

Figure 5:
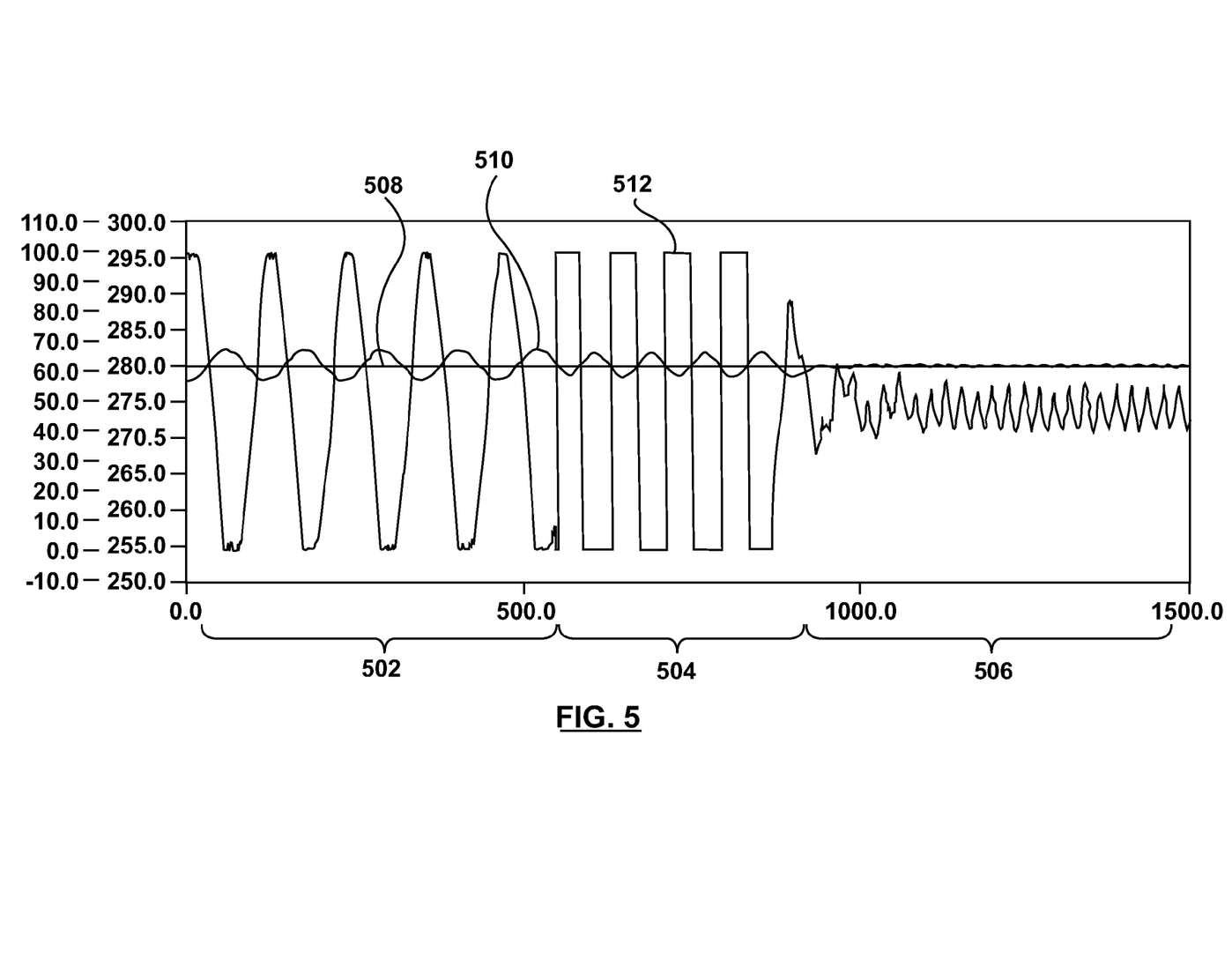
FIG. 5 is a schematic diagram depicting a duty cycle fluctuation, a set point and a temperature associated with a temperature management device before, during and after execution of the method of FIG. 2.

More specifically, FIG. 5 illustrates three time intervals:
a first time interval 502—before execution of the method of FIG. 2;
a second time interval 504—during execution of the method of FIG. 2; and
a third time interval 506—after execution of the method of FIG. 2.

FIG. 5 further depicts a first curve 508 representative of a set point associated with a temperature management device being controlled; a second curve 510 representative of a temperature associated with the temperature management device being controlled and a third curve 512 representative of a duty cycle setting.

During the first time interval 502, the third curve 512 oscillates, representative of changes in the duty cycle changes made by a controller (ex. the first barrel heater controller 125a, the second barrel heater controller 125b and the third barrel heater controller 125c) in an attempt to keep the temperature at the set point. The second curve 510 also oscillates above and below the first curve 508, representative of the temperature oscillation above and below of the set point.

During the second time interval 504, the third curve 512 can be said to be associated with a square wave pattern, which is just one example of the pre-determined probe format. During the second time interval 504 the method of FIG. 2 is being executed as described in greater detail herein above.

During the third time interval 506, the second curve 510 does not substantially deviate from the first curve 508 representative of the temperature associated with the temperature management device being maintained substantially at the set point after the method of FIG. 2 is executed. Also, within the third time interval 506, magnitude of the fluctuation of the third curve 512 is not as large the magnitude of fluctuation during the first time interval 502 and the second time interval 504, representative of a more stable duty cycle setting range being maintained after execution of the method of FIG. 2 is completed.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. A method of operating a temperature management device, the method comprising:
   determining a predetermined format for a probe;
   transmitting towards the temperature management device the probe having the predetermined format;
   receiving a probe response, the probe response being representative of at least one dynamic operational characteristic of the temperature management device, said dynamic operational characteristic being responsive to the predetermined format of the probe;
   analyzing the probe response to obtain a control parameter suitable for controlling operation of the temperature management device.

2. The method of claim 1, wherein the predetermined format comprises a predetermined pattern.

3. The method of claim 2, wherein said pre-determined pattern comprises a square wave pattern that is configured to control at least amplitude of fluctuation of a duty cycle setting conveyed to the temperature management device.

4. The method of claim 2, wherein said predetermined pattern comprises a square wave pattern that is configured to control frequency and amplitude of fluctuation of a duty cycle setting conveyed to the temperature management device.

5. The method of claim 1, wherein said temperature management device forms, when in use, part of a molding machine; and wherein said temperature management device comprises one of:
   a barrel heater associated with an injection unit;
   a hot runner heater;
   an air conditioner;
   a dehumidifier.

6. The method of claim 1, wherein said analyzing comprises calculating an average peak value ($A_{PEAK}$) and an average frequency value ($A_{FREQUENCY}$) of fluctuation of the probe response.

7. The method of claim 6, further comprising recalculating said average peak value ($A_{PEAK}$) and said average frequency value ($A_{FREQUENCY}$) until a validation parameter is satisfied.

8. The method of claim 7, further comprising calculating said validation parameter.

9. The method of claim 7, further comprising calculating said control parameter based on at least said average peak value ($A_{PEAK}$), said average frequency value ($A_{FREQUENCY}$) and said predetermined format.

10. The method of claim 1, wherein said temperature management device comprises a first temperature management device and a second temperature management device, and wherein said transmitting comprises:
    transmitting a first probe having a first predetermined format to said first temperature management device; and
    transmitting a second probe having a second predetermined format to said second temperature management device.

11. The method of claim 10, wherein said first predetermined format and said second predetermined format are the same.

12. The method of claim 11, wherein said receiving comprises:
    receiving a first probe response responsive to said first probe; and
    receiving a second probe response responsive to said second probe.

13. The method of claim 12, wherein said analyzing the probe response to obtain a control parameter suitable for controlling the temperature management device comprises:
    analyzing said first probe response to obtain a first control parameter suitable for controlling the first temperature management device; and
    analyzing said second probe response to obtain a second control parameter suitable for controlling the second temperature management device.

14. The method of claim 1, wherein said temperature management device is associated with a controller and wherein:
   said transmitting to the temperature management device a probe comprises transmitting said probe to the controller; and
   said receiving a probe response comprises receiving said probe response from the controller.

15. The method of claim 14, wherein said controller comprises a Proportional-Integral-Differential (PID) controller and wherein said control parameter comprises a set of constants, the set of constants including a $K_I$ (integral gain) constant, a $K_P$ (proportional gain) constant and a $K_D$ (derivative gain) constant.

16. The method of claim 14, further comprising transmitting an indication of said control parameter to said controller.

17. The method of claim 1, wherein said determining said predetermined format comprises calculating a probe parameter.

18. The method of claim 17, wherein said probe parameter comprises a first probe parameter ($A_{RANGE}$) and a second probe parameter ($V_{FREQUENCY}$), the first probe parameter ($A_{RANGE}$) being indicative of a range for a duty cycle setting and the second probe parameter ($V_{FREQUENCY}$) being indicative of a frequency of change of the duty cycle setting.

19. The method of claim 18, wherein said probe parameter comprises a first probe parameter ($A_{RANGE}$), the first probe parameter ($A_{RANGE}$) being indicative of a range for a duty cycle setting and wherein a change in duty cycle setting within the range for a duty cycle setting is triggered when a temperature associated with the temperature management device reaches a set point.

20. A computing apparatus configured to be coupled to a controller of a temperature management device, the computing apparatus configured to:
   determine a predetermine format for a probe;
   transmit to the controller the probe having the pre-determined format;
   receive from the controller a probe response, the probe response indicative of at least one dynamic operational characteristic of the temperature management device, said at least one dynamic operational characteristic being responsive to the predetermined format of the probe;
   analyze the probe response to obtain a control parameter suitable for enabling the controller to control operation of the temperature management device.

21. The computing apparatus of claim 20, wherein the predetermined format comprises a square wave pattern that is configured to control one of:
   at least an amplitude of fluctuation of a duty cycle setting conveyed to the temperature management device; and
   frequency and amplitude of fluctuation of a duty cycle setting conveyed to the temperature management device.

22. The computing apparatus of claim 21, wherein said temperature management device forms, when in use, part of a molding machine.

23. The computing apparatus of claim 22, wherein said temperature management device comprises one of:
   a barrel heater associated with an injection unit;
   a hot runner heater;
   an air conditioner;
   a dehumidifier.

24. The method of claim 1, further comprising repeating said receiving and analyzing steps until a validation parameter is satisfied.

* * * * *